FIG_1
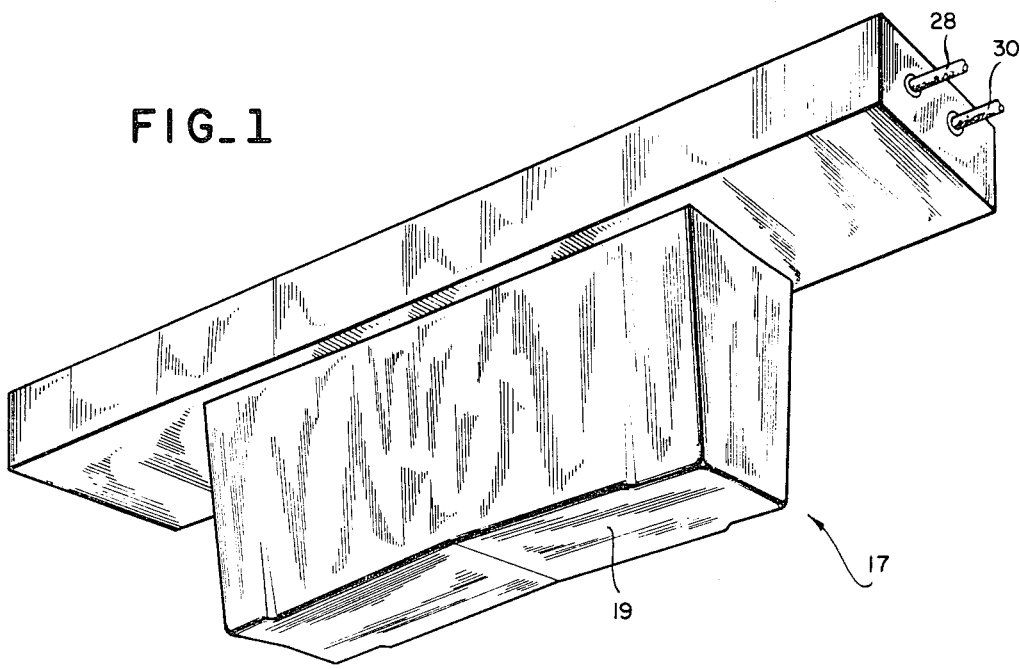
FIG_2
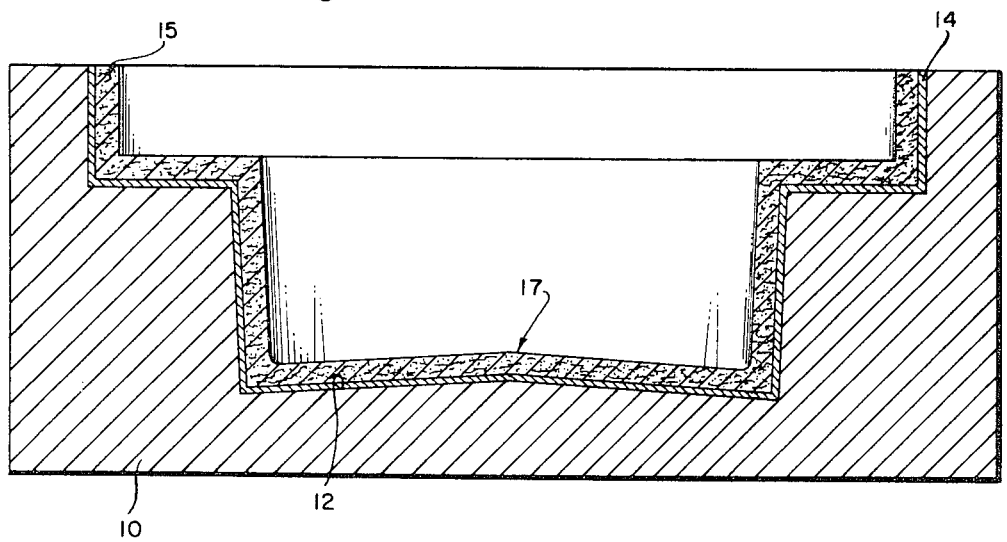
INVENTORS
GEORGE J. WALKEY
FRANK N. ADGATE
By George C. Sullivan, agent
Frank L. Zugelter
Attorney

United States Patent

[11] 3,631,745

| [72] | Inventors | George J. Walkey<br>Burbank;<br>Frank N. Adgate, Granada Hills, both of Calif. |
|---|---|---|
| [21] | Appl. No. | 39,807 |
| [22] | Filed | May 22, 1970 |
| [45] | Patented | Jan. 4, 1972 |
| [73] | Assignee | Lockheed Aircraft Corporation<br>Burbank, Calif.<br>Original application July 6, 1967, Ser. No. 657,720, now Patent No. 3,533,271, dated Oct. 13, 1970. Divided and this application May 22, 1970, Ser. No. 39,807 |

[54] METHOD OF FABRICATING METAL DIES
20 Claims, 8 Drawing Figs.

[52] U.S. Cl. .................................................. 76/107 R,
164/19, 164/46, 264/221, 264/225
[51] Int. Cl. .................................................. B21k 5/20
[50] Field of Search ......................................... 76/107 R;
264/221, 225, 327, 337, 338, 342; 164/19, 23, 46, 34

[56] References Cited
UNITED STATES PATENTS

| 1,935,916 | 11/1933 | Ragsdale ..................... | 164/46 X |
| 2,974,388 | 3/1961 | Ault ............................. | 264/221 X |
| 3,182,361 | 5/1965 | Trimble ........................ | 164/46 X |
| 3,422,663 | 1/1969 | James et al. ................. | 76/107 X |

*Primary Examiner*—Bernard Stickney
*Attorneys*—Frank L. Zugelter and George C. Sullivan

ABSTRACT: A method of fabricating by thermal spraying a die or mold in regard to the manufacture of a high-strength material product, titanium being an example of the material of such product. A wooden or plaster pattern is made or cast into the form of the die or mold, and thereafter an inorganic matrix or substrate of a predetermined thickness is cast thereover. The matrix is oven or air cured, after which it is separated from the pattern and the die material is thermally sprayed over same after the matrix has been preheated to the temperature of the sprayed material. The preheat temperature is maintained during the thermal spraying process. The combination is then placed in a preheated oven, for slow cooling. Due to different contracting rates of the materials of the matrix and die, a clean metallic die surface results. After such cooling, the combination is separated and any excess spray is removed. A reinforcing mixture is then introduced into the cavity formed in the die. Upon cooling and hardening of such mixture, the die or mold is provided with great structural integrity in its shell and provides for a tough, high-temperature characteristic. A modified embodiment of and illustrative examples of dies or molds formed from this process are included in the disclosure.

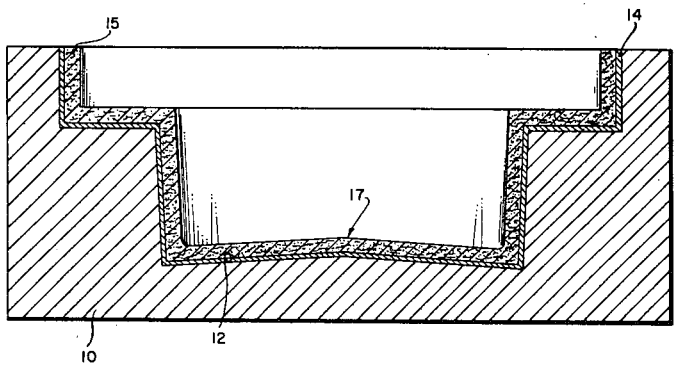

PATENTED JAN 4 1972 3,631,745
SHEET 2 OF 3
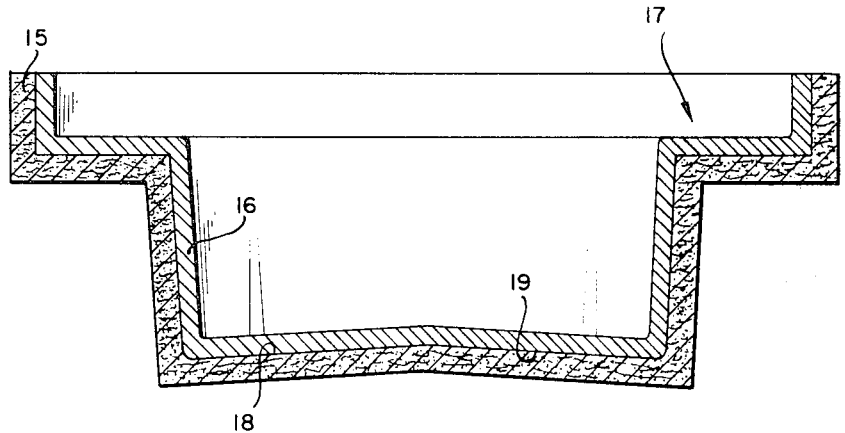
FIG_3
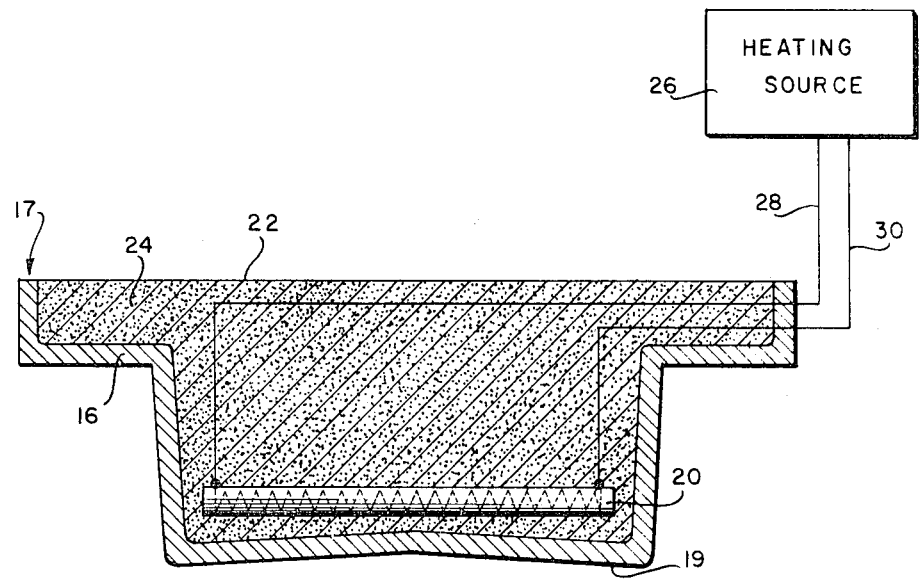
FIG_4
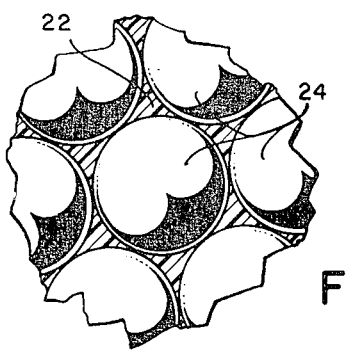
FIG_8
*INVENTORS*
GEORGE J. WALKEY
FRANK N. ADGATE
By George C. Sullivan, agent
Frank L. Zugelter
Attorney

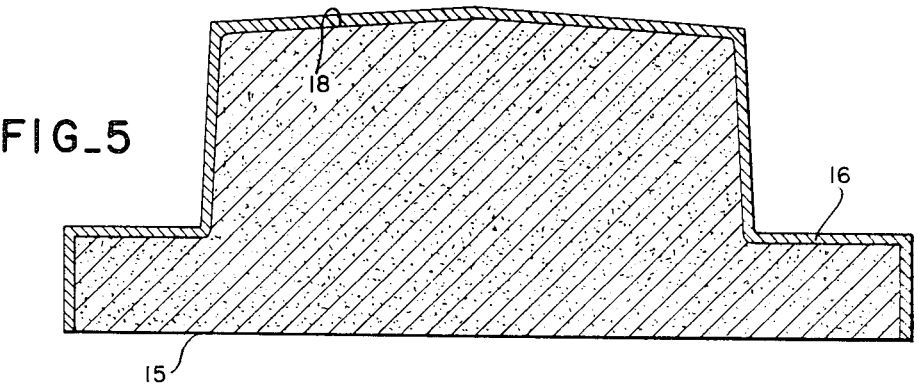
FIG_5
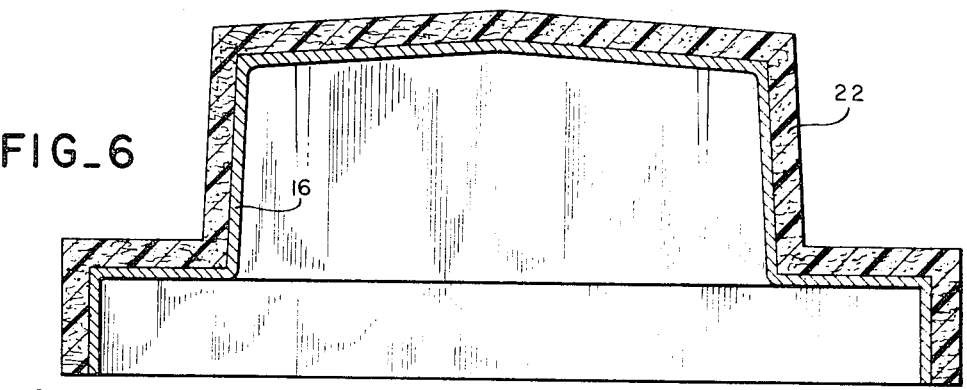
FIG_6
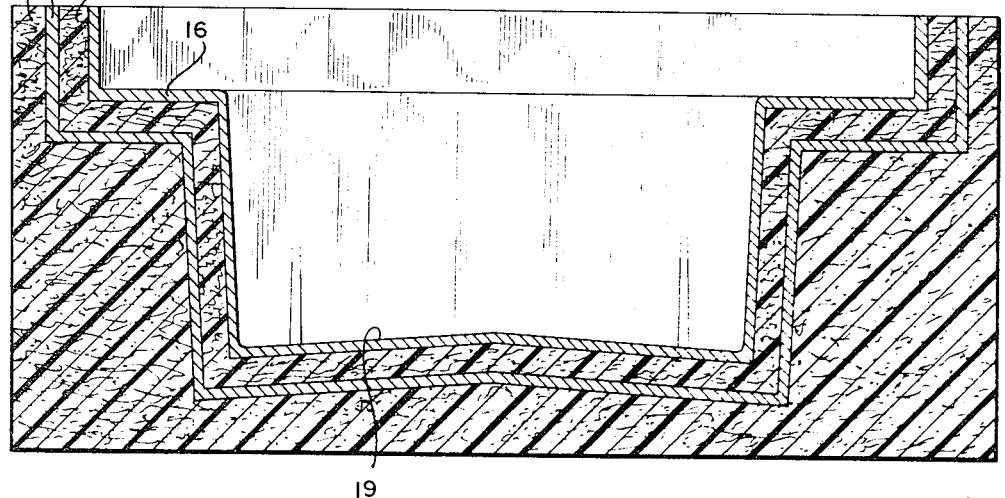
FIG_7
INVENTORS
GEORGE J. WALKEY
FRANK N. ADGATE
BY George C. Sullivan, agent
Frank L. Zugelter
Attorney 3,631,745

METHOD OF FABRICATING METAL DIES

This is a divisional application of our copending application, Ser. No. 657,720, filed July 6, 1967, now U.S. Pat. No. 3,533,271, issued Oct. 13, 1970, entitled Metal Dies.

BACKGROUND OF THE INVENTION

1. Field of the Invention

The field of art to which the invention is most likely to pertain is generally located in the class of processes relating to the manufacture of metal dies. Class 76, Metal Tools and Implements, Making, and Class 72, Metal Deforming, U. S. Patent Office Classifications, appear to be the applicable general areas of art in which claimed subject matter of the type involved here has been classified in the past.

2. Description of the Prior Art

Processes of making metal dies, the art to which this invention most likely pertains, are disclosed in the following U.S. Pats.: Nos. 1,935,916; 2,171,599; 2,241,996; 2,250,246; 2,258,451; 2,258,452; 2,280,864; 2,280,866; 2,281,634; 2,288,658; 2,293,062; 2,293,571; 2,479,598; 2,629,907; 3,077,647; 3,125,974 and 3,182,361.

SUMMARY

The ever-increasing use of high-strength substances such as titanium in many of today's products has greatly intensified the need for an inexpensive method of fabricating dies. Aircraft and spacecraft, for example, are requiring larger amounts of high-strength materials than ever before. However, because only a few parts may be needed and produced from a single die, the conventional hot stamping process commonly used becomes prohibitively expensive.

Many industries have turned to other techniques such as the Shaw process or the Keller method to at least partially alleviate this high cost.

The Shaw process uses a conventional casting technique with a special sand matrix manufactured from Bakelite and resin. While close tolerances are obtainable by this process it is economically unsatisfactory in high-temperature applications with hard materials.

The Keller method, on the other hand, is a pantographiclike process and initially entails the making of the finished article as a master. A machine is then slaved, by conventional means such as a stylus bearing against the outer surface of the master, to produce the desired copies. While this method may be utilized for hard materials, it is very slow, comparatively expensive and completely unsuited for tracing complex shapes.

As a consequence of the various disadvantages of the above methods, one approach has been to fabricate dies by means of various thermal spray processes. These processes generally involve the deposition of a metallic layer on a plaster casting to produce a die shell. The use of such processes indeed offer several important advantages in that the time required to produce the die as well as the finished article, is much less than by normal machining methods. In addition, complexity of shape is not an important factor as it is in the Keller method.

However, metal spray techniques in the past have been severely limited to low strength, low-temperature melting metals such as zinc or tin. One reason for this has been the natural tendency of the sprayed metal as it cooled to contract, such shrinkage causing it to separate from the patterned surface. This tendency produced cracks and spalling, apparently due to the uneven thermal stresses produced in the metal when sprayed onto the pattern. Consequently, it has heretofore been very difficult to spray an accurate negative or mold having sufficient strength or rigidity for practical use.

While such dies are suitable for forming low-strength materials and for operating at low temperatures, they cannot be used to form strong materials at high temperatures. Thus, titanium, for example, which must be formed at a high temperature because of its tendency to "spring-back" or return to its original shape, could not until now, be formed on a die manufactured by the thermal spray method.

It is, therefore, a purpose of this invention to provide a method of fabricating a strong, high-temperature die wherein a substrate or matrix of predetermined strength is deposited upon a pattern to a desired thickness. After being heated and cured, to remove excess water, the matrix is separated from the pattern and is again heated to a temperature compatible with that of the metal to be subsequently deposited thereon. The combination is thereafter placed in a preheated oven and allowed to slowly cool, at which time, the substrate will crack because of its differences in predetermined strength, thickness, and thermal coefficient of expansion as compared with those of the metallic layer. Upon having the matrix thoroughly removed from its surface, the resulting metal shell or die is filled with a selected mixture of reinforcing material and binder and heated, causing the binder to liquefy. As the mixture cools, the binder hardens and adheres the reinforcing material to the die shell.

The procedure of the present invention as applied to the production of a die is illustrated by the accompanying drawing, wherein:

FIG. 1 is a perspective view of a heated die configuration manufactured in accordance with the invention;

FIG. 2 is a longitudinal section through a mold pattern after the substrate or matrix has been deposited thereon;

FIG. 3 is a matrix of FIG. 2 after it has been removed from the mold pattern and a layer of die material deposited thereon;

FIG. 4 is similar to FIG. 1 and illustrates the die material separated from the matrix with a mixture of reinforcing material and binder in reinforcing relationship therewith;

FIG. 5 illustrates an alternate embodiment of the matrix with a layer of die material deposited thereon;

FIG. 6 is the die material layer of FIG. 5 separated from the matrix with a binder deposited thereon;

FIG. 7 is the die of FIG. 6 with additional layers of die material deposited thereon; and FIG. 8 is an enlargement of the mixture of reinforcing material and binder of FIG. 4.

DESCRIPTION OF THE PREFERRED EMBODIMENTS

Referring to FIGS. 1–4 and 8, there is depicted a mold 10 having a surface 12 dimensionally contoured to a desired configuration and smoothness. In contrast to the molds used in prior art processes, particularly where sintering procedures are used, mold 10 may be fabricated from an inexpensive material such as plastic, plaster or wood. This economy is possible since the mold 10 and the surface 12 are not subject to deterioration as a result of subsequent spraying steps.

The surface 12 is first coated with a parting agent to provide a parting coating 14. The function of the coating 14 is to facilitate removal of the molded refractory skeleton from the mold 10. In the practice of this invention, the parting agent may be applied in any suitable fashion such as by spraying or pouring. Although several layers of wax material will facilitate the separation of the skeleton from the mold 10, sprayed Teflon, molybdenum disulfide or lacquer may also be used as the parting agent.

Once the mold has been coated with a parting agent, an inorganic matrix or substrate 15 is deposited thereover and over the coated surface 12 by conventional means such as spraying, ladling or the like. The inorganic matrix 15 is fabricated from an aluminide or beryillide such as aluminum oxide or beryillium oxide or from a cement. The matrix 15 is of such a strength, thickness and substance that it is compatible with die material 16 to be sprayed thereon at a subsequent time. It is of primary importance that the substance used for the matrix 15 be of a strength sufficient to withstand the heat during the preheating procedures and the internal pressures of handling which are produced during the process. For high-temperature applications and the ability to withstand internal stresses, a high-stength cement has been found to be generally superior to plaster of Paris or dental plaster.

The resulting strength of the deposited matrix 15 is a critical consideration since the matrix 15 must have a compressive strength which is less than the yield strength of the die material 16 which is subsequently deposited thereon. Were it otherwise, die 17 would crack during the cooling process. After a predetermined thickness is reached, the matrix 15 is oven or air cured, depending upon the type of die 17 to be fabricated and the die material to be used.

Highly acceptable results have been obtained by providing a matrix 15 of the high-strength cement commercially known as "Glass-Rok" cured in an oven at 300°–400° F. for a period of approximately 2 hours. The curing time is, of course, dependent upon the characteristics of the specific material being cured and the curing temperature, but it is required that the water contained within the matrix 15 be completely removed since during the heating cycle any water remaining in the matrix 15 turns to steam, forming internal bubbles, thereby cracking the matrix 15 or deforming the matrix surface 18.

After the matrix 15 cools, it is separated from the mold 10, such removal being facilitated by cracking of mold 10 which usually occurs during the cooling cycle. If the mold 10 does not crack, it may be removed from matrix 15 by use of conventional means (e.g., hammer and chisel). Upon being removed, the matrix 15 is ready to be preheated to a temperature compatible with the die material 16 to be subsequently deposited thereon. The die material 16 itself is usually a metal or metal alloy but may comprise other types of inorganic materials such as plastic, cement or plaster. Thus, while a metallic material is referred to hereinafter, it is to be noted that this is for illustrative purposes only. In addition, an organic which, upon being heated, becomes an inorganic (e.g., calcium lactate into calcium oxide), may be used.

In order to obtain such temperature compatibility of the matrix 15, it is required that the preheat temperature be approximately that which results in a 50 percent yield strength of the sprayed metal. While some latitude may be taken with regard to this temperature, the above has been found to be generally satisfactory. In handling aluminum materials, for example, a requirement exists that the temperature of the preheated matrix 15 be approximately 800° F., while in handling steel or steel alloys the heating requirement is approximately 1,500° F.

When the desired preheat temperature is reached, the die material 16 is sprayed on the matrix 15 to form a die 17 of predetermined yield strength, and of thickness compatible with the compressive strength of the matrix 15. During the metal spraying process, the preheat temperature is maintained by conventional and suitable means such as a gas burner or oxyactylene flame (not shown) until such time as the desired thickness of the sprayed metal is achieved. Again it is to be noted that the matrix 15 must be sufficiently thin that its compressive strength is less than the yield strength of the die 17. As an example, based upon the reported structural properties of a mild steel, such as S.A.E. 1010 (30,000 p.s.i. tensile strength at 1,000° F.) and a high-strength cement such as "Glass-Rok" (4,000 to 6,000 p.s.i. compressive strength), a cement matrix 15 having a thickness within the approximate range of seven-sixteenths inch to nine-sixteenths inch has been found to fail under the compressive load applied by the thermal contraction of a ¼ inch mild steel coating at room temperature.

The matrix surface 18 need not be coated with a parting agent as taught by the prior art of metal spraying since the matrix 15 will resist spalling on die surface 19 without the requirement of a coating therebetween because of the preheating of the matrix 15 and the preselected strength of the materials used.

After the layer of die material 16 has been deposited upon the preheated matrix 15, the combination is placed in a preheated oven (not shown) and allowed to slowly cool for a length of time precalculated to result in failure of the matrix 15. The temperature of the preheated oven should be approximately that to which the matrix 15 was heated prior to the deposition of die material.

During the cooling process, the die 17 and the matrix 15 cool and contract at different rates because of their different coefficients of thermal expansion. The usual result is a severe cracking of the matrix 15. However, as previously indicated, this cooling process does not always cause the cracking of the matrix 15. In such case it can be subsequently removed by suitable conventional means, as by hammer and chisel or by grit blasting it with 40 mesh chilled iron grit at 80 p.s.i. A clean metallic surface has been produced by each of the noted removal methods, no apparent damage to die surface 19 having resulted. The die 17 can, by the aforementioned procedure, be produced to any thickness desired, but because of its "shell-like" configuration would be somewhat limited in strength and thus substantially unsuited for high temperature forming of high-strength materials but could, however, be utilized for forming lower strength materials such as plastic and thin aluminum sheet.

Although under normal circumstances the matrix 15 cracks, it is to be noted that the materials used for the die 17 and the matrix 15 may be chosen of materials having nearly identical thermal coefficients of expansion thereby contracting at almost the same rate. While under these circumstances neither material will crack during the cooling period, this procedure is generally very costly and is therefore economically unsatisfactory over the method previously discussed.

It is of course apparent that in performing the above steps dimensional control, surface hardness and other metallurgical properties of the materials used for the matrix 15 and die 17 should be determined prior to the initiation of the process. This provides the fabricator with the ability to predict and control critical dimensions required to assure that the yield strength of the die 17 is greater than the compressive strength of the matrix 15.

After the combination has cooled the matrix 15 is separated from the die 17 and excess overspray, if any, is removed by conventional means such as by sawing, grinding, or the like, until the desired finished dimensions are obtained. Since the finished dimensions are unaffected by excess overspray, it is not mandatory that it be removed. However, it has been found beneficial in that a more compact, easier handling and lighter weight die can be achieved if the additional material is removed.

When the desired finished dimensions have been achieved, a mixture of binder material 22 (FIG. 4) and reinforcing material 24 (the combination being sometimes referred to as reinforcing mixture) such as epoxy resin and metal shot, respectively, are deposited by pouring, ladling or the like, within a cavity formed in the die 17 opposite its surface 19. The ingredients of the reinforcing mixture are carefully chosen to provide the desired strength of the finished die 17 and in view of temperatures involved in forming the structure of the ultimate product for which the die of this invention is provided. After this mixture has been deposited the combination is oven heated to a temperature sufficient to liquefy the binder material 22 which, upon cooling, adheres the reinforcing material 24 to the die 17, thereby forming one continuous, solid, die mass. If a hot forming die is desired to be fabricated, a heating member 20 may be located within the die 17 and surrounded by the reinforcing mixture. The heating member 20 may be of any conventional means such as a high-resistance wire or heating rod electrically connected to a heating source 26 by wires 28 and 30 as best illustrated in FIG. 4. The usage of a heating member 20 located within the die serves the dual purpose of heating the reinforcing mixture, thereby eliminating the requirement for over heating and also permits the finished die to be integrally heated for the purpose of hot forming materials such as titanium. The temperature to which the reinforcing mixture is heated should approximate that to which the matrix 15 and die 17 were previously preheated. The binder material 22 is selected such that it will liquefy at or near the preheat temperature and when cooled cause the reinforcing material 24 to adhere to the interior portion of the die surface 19.

Referring to FIGS. 5-7, a modified embodiment of the present invention is depicted wherein a matrix 15 having a surface 18 of dimensionally contoured shape and smoothness has a die material 16 deposited thereon. The matrix 15 in the modified embodiment may be of standard composition and for this purpose plaster of Paris has been found to be generally satisfactory. The die material 16 sprayed upon the contoured surface 18 need not be heated in the modified embodiment since it has been found that preheat is required only when a thick coating of die material 16 is deposited. In this regard coatings of 3/16 inch and under do not require the die material to be heated since the internal stress determines the necessity for preheat and is a function of thickness. After the die material 16 has set, a fiber glass binder 22 is deposited over the die material 16 to a thickness of approximately one-half inch. After air curing for about 3½ hours at room temperature, copper-reinforcing material 24 is deposited on the binder 22 at room temperature to a thickness of one-eighth inch. Finally, an additional layer of epoxy impregnated fiber glass binder 22 is deposited over the copper layer. By such construction a composite die 17 may be formed for many useful purposes, such as filament winding or "lay up" of plastic parts or for the forming of aluminum of thicknesses of 0.060 inch or less.

The following examples are generally illustrative of the process:

EXAMPLE 1

A wooden mold 10 of the character illustrated in FIG. 2 and having a desired dimensionally contoured surface 12 was coated with a 0.005 inch layer of paste wax to form a parting coating 14 over its surface 12. An inorganic matrix 15 of high-strength cement was thereafter deposited at room temperature upon the waxed surface 12 until the matrix 15 was one-half inch thick. The matrix 15 was deposited by spraying it over the surface 12 and was precalculated to be of a thinness sufficient to crack during the subsequent tooling steps. The matrix 15 was then oven cured at a temperature of 350° F. for 2 hours and the mold separated therefrom after it had cooled to room temperature. The matrix 15 was next preheated to 1,500° F. and S.A.E. 1010 steel sprayed thereon to a thickness of one-quarter inch. Upon obtaining the desired thickness, the combination was placed in a preheated oven at 1,500° F. and allowed to furnace cool for a period of 4 hours. The matrix 15 cracked for the reasons previously enumerated and the die surface 19 was cleaned of the residue matrix material by grit blasting with 40 mesh chilled iron grit at 80 p.s.i. A heating rod 20 connected to a heat source 26 and a mixture of 10 percent sodium silicate binder material 22 and 90 percent iron shot reinforcing material 24 were then placed within the cavity of the die 17 opposite the die surface 19. The mixture was then heated to a temperature of 1,500° F. and allowed to air cool until it reached room temperature. This die was found to be suitable for both cold and hot forming of titanium and other high-strength materials at temperatures of 1,450° F. and above.

EXAMPLE 2

A wooden mold 10 having a desired dimensionally contoured surface 12 was coated with molybdenum disulfide to form a parting coating 14 of 0.004 inch thickness. An inorganic matrix 15 of beryllium oxide was then deposited upon the coating 14 to a thickness of one-quarter inch, air cured at a temperature of 350° F. and then allowed to cool for 24 hours to room temperature. Upon cooling, the matrix 15 separated from the mold 10 and was then preheated to 800° F. Aluminum was thereafter sprayed on the matrix 15 while the matrix 15 was maintained at 800° F. by a gas burner. A metal die 17 shell of a one-half inch thickness in length was formed and the combination thereafter placed in an oven preheated to 800° F., the oven then being turned off and the die allowed to cool for 4 hours. Upon removal of the die from the oven, the matrix 15 was found to be cracked. The die surface 19 was cleaned by grit blasting with 40 mesh iron grit at 80 p.s.i. A mixture of 5 percent epoxy resin binder material 22 and 95 percent chopped fiber glass reinforcing material 24 was then deposited within the die 17 opposite the die surface 19. The combination was then oven cured at a temperature of 150° F. and subsequently allowed to air cool for a period of 24 hours. The die was found suitable for cold forming low-strength metals.

EXAMPLE 3

A plastic mold 10 having a predetermined contoured surface 12 was coated with molybdenum disulfide to a thickness of 0.002 inch to form a parting coating 14 over its surface 12. A plaster of Paris matrix 15 was then deposited, at room temperature, over the parting coating 14. The matrix 15 was then oven cured at a temperature of 350° F. for 4 hours and thereafter removed from the mold 10. Aluminum was next sprayed over the matrix 15 to a thickness of one-eighth inch. The matrix 15 and the aluminum were not preheated during this step since the resultant internal stresses determine the preheating requirement and are a function of the thickness of the material. Epoxy impregnated fiber glass was then deposited over the aluminum at room temperature to a thickness of one-half inch. The combination was then air cured for 3½ hours at room temperature. Upon reaching room temperature a ⅛-inch layer of copper was deposited at room temperature on the fiber glass. The die 17 was then filled with epoxy impregnated fiber glass reinforcing material 24 and air cured for 3½ hours. The die was found to be suitable for filament winding and forming aluminum of thicknesses of 0.060 inch or less.

EXAMPLE 4

A plastic mold 10 was coated with lacquer to form a parting coating 14 of a thickness of 0.003 inch. Dental plaster was then deposited on the coating 14 to a thickness of one-quarter inch and the combination oven cured at 225° F. for 2 hours. The matrix 15 was then removed from the mold 10 and preheated to 800° F. Zinc was then sprayed to 300° F. upon the matrix 15 to form the die 17. The layers were then allowed to cool to 100° F., requiring 2 hours. After the combination had cooled the matrix 15 was removed from the die surface 19 and a mixture of 10 percent plaster of Paris binder material 22 and 90 percent aluminum reinforcing material 24 was deposited within the die 17 opposite the die surface 19. The combination was then oven cured at 250° F. for 3 hours and allowed to air cool for 24 hours, at which time room temperature was achieved. A die was produced suitable for forming plastics and filament winding.

EXAMPLE 5

A wooden mold 10 was coated with a paste wax 0.004 inch thick. The matrix 15 composed of finely powdered Portland cement was deposited on the mold 10 to a thickness of three-eighths inch and thereafter cured at a temperature of 175° F. for 4 hours. The matrix 15 was removed from the mold 10 and then sprayed with a ½-inch layer of copper at room temperature. The matrix 15 was then removed from the copper die 17 by means of grit blasting and a "Cerro-Bend" deposited within the die 17 opposite the die surface 19. Cerro-Bend is a well-known low-temperature melting (185° F.) alloy of bismuth and lead, used in die work, and is readily available from a number of manufacturers. The mixture was then allowed to set for approximately 4 hours producing a die suitable for forming plastics.

The products produced in relation to these examples, while suitable for the indicated uses, may obviously be found readily acceptable for other applications as well.

The various features and advantages of the invention are thought to be clear from the foregoing description. Other advantages not specifically enumerated will undoubtedly occur

We claim:
1. A method for manufacturing a die comprising:
preparing a pattern of predetermined shape;
depositing a parting material upon the pattern so as to form a parting coating;
depositing a matrix upon the parting coating;
curing the matrix;
removing the matrix from the pattern;
depositing a layer of inorganic material upon the cured matrix so as to form a die surface therebetween;
cooling the matrix and the inorganic material at a controlled rate; and
removing the matrix from the die surface of the inorganic material so as to form a die.

2. A method for manufacturing a die as defined in claim 1 wherein the inorganic material is a metal or metal alloy.

3. A method for manufacturing a die as defined in claim 1 wherein the inorganic material is a ceramic.

4. A method for manufacturing a die as defined in claim 1 including:
heating the reinforcing material so as to cause it to adhere to the die.

5. A method for manufacturing a die as defined in claim 1 including:
depositing a reinforcing material upon the die opposite the die surface;
depositing a binder material upon the die opposite the die surface, the binder material being intermixed with the reinforcing material; and
heating and then cooling the binder material so as to cause it to adhere the reinforcing material to the die.

6. A method for manufacturing a die comprising:
preparing a pattern of predetermined shape;
depositing a parting material upon the pattern so as to form a parting coating;
depositing a matrix upon the parting coating;
curing the matrix;
removing the matrix from the parting coating and pattern;
heating the matrix;
depositing a layer of inorganic material upon the cured and heated matrix so as to form a die surface therebetween;
cooling the matrix and the inorganic material at a controlled rate; and
removing the inorganic material from the matrix so as to form a die.

7. A method for manufacturing a die as defined in claim 6 wherein the matrix is heated to approximately 50 percent of the yield strength of the inorganic material.

8. A method for manufacturing a die as defined in claim 6 including:
depositing a mixture of binder and reinforcing material upon the die opposite the die surface; and
heating and cooling the mixture so as to cause the binder material to adhere the reinforcing material to the die.

9. A method of manufacturing a die comprising:
preparing a desirably shaped pattern;
depositing a parting coating upon the pattern;
depositing an inorganic matrix upon the coated pattern;
curing the matrix;
removing the matrix from the pattern;
heating the matrix;
depositing a metallic layer upon the heated and cured matrix so as to form a die;
cooling the matrix and the die;
removing the matrix from the cooled die;
depositing a reinforcing material upon the die opposite the forming surface of the die; and
curing the reinforcing material so as to cause it to adhere to the die.

10. A method of manufacturing a die as defined in claim 9 including:
depositing a binder upon the die opposite the die surface, the binder being intermixed with the reinforcing material; and
curing the binder so as to cause it to adhere the reinforcing material to the die.

11. A method of manufacturing a die as defined in claim 9 wherein the matrix and the die are cooled in a preheated oven at a temperature approximately equal to the temperature to which the matrix was heated prior to having the metallic layer deposited thereon.

12. A method of manufacturing a die comprising:
preparing a desirably shaped pattern;
depositing a parting coating upon the pattern;
depositing an inorganic matrix upon the coated pattern;
curing the matrix;
removing the matrix from the coated pattern;
heating the matrix;
depositing a metallic layer upon the heated matrix at a temperature substantially equal to the temperature of the heated matrix so as to form a die shell having a die surface;
cooling the heated matrix and the die shell;
removing the cooled matrix from the die shell;
depositing a mixture of reinforcing material and binder upon the die shell opposite the die surface; and
curing said mixture so as to cause the binder to adhere the reinforcing material to the die shell.

13. A method of manufacturing a die as defined in claim 12 wherein said matrix and said metallic layer have substantially equal thermal coefficients of expansion.

14. A method of manufacturing a die as defined in claim 12 wherein said matrix is organic but becomes inorganic upon being heated.

15. A method of manufacturing a die as defined in claim 12 wherein the matrix is heated to approximately 50 percent of the yield strength of the metallic layer subsequently thereon.

16. A method of manufacturing a die as defined in claim 12 wherein the mixture comprises approximately 5 percent by volume binder and 95 percent by volume reinforcing material.

17. A method of manufacturing a die as defined in claim 17 wherein the binder is sodium silicate and wherein the reinforcing material is metal shot.

18. A method of manufacturing a die comprising:
preparing a pattern of predetermine shape;
depositing a parting coating upon the pattern;
depositing a matrix upon the coated pattern;
curing the matrix;
removing the matrix from the coated pattern;
depositing a first die material upon the matrix so as to form a die shell having a die surface;
removing the die shell from the matrix;
depositing a binder material upon the die shell opposite the die surface; and
depositing a second die material upon the binder material in reinforcing relationship with the first die material.

19. A method of manufacturing a die as defined in claim 18 including depositing a binder material upon the second die material in reinforcing relationship with the first die material.

20. A method of manufacturing a die as defined in claim 19 wherein the first and the second die materials are metal or metal alloys and the binder material is epoxy resin.

* * * * *

UNITED STATES PATENT OFFICE
CERTIFICATE OF CORRECTION

Patent No. 3,631,745        Dated January 4, 1972

Inventor(s) George J. Walkey, et al

It is certified that error appears in the above-identified patent and that said Letters Patent are hereby corrected as shown below:

Column 5, line 49, the bold type number "40" should not be in bold type, but rather in the type shown by the number "80" appearing in the same line. Column 6, line 42, change "to", second occurrence to -- at -- . Column 8, line 47, change "17" to read -- 12 -- .

Signed and sealed this 14th day of November 1972.

(SEAL)
Attest:

EDWARD M. FLETCHER, JR.
Attesting Officer

ROBERT GOTTSCHALK
Commissioner of Patents